United States Patent [19]

Moon

[11] Patent Number: 5,423,466
[45] Date of Patent: Jun. 13, 1995

[54] SKI CARRIER

[76] Inventor: Soo M. Moon, 101, Ihwavilla, 986-1, Mansu-ldong, Namdong-ku, Inchon, Rep. of Korea

[21] Appl. No.: 129,472

[22] Filed: Sep. 30, 1993

[30] Foreign Application Priority Data

Nov. 12, 1992 [KR] Rep. of Korea ............... 1992-22225
Jun. 1, 1993 [KR] Rep. of Korea ................ 1993-9381

[51] Int. Cl.$^6$ ............................................... B60R 9/00
[52] U.S. Cl. ................................... 224/324; 224/309; 224/315; 224/917; 248/206.5; 248/205.8; 248/205.5
[58] Field of Search .............. 224/917, 309, 315, 324, 224/327; 248/206.5, 205.8, 205.5, 205.6, 205.7, 363, 467

[56] References Cited

U.S. PATENT DOCUMENTS

| | | | |
|---|---|---|---|
| 4,043,531 | 8/1977 | Green | 248/205.8 |
| 4,084,735 | 4/1978 | Kappas | 224/917 |
| 4,133,575 | 1/1979 | Mader | 248/205.8 |
| 4,720,031 | 1/1988 | Zimmerman | 224/917 |
| 5,087,005 | 2/1992 | Holoff et al. | 248/205.8 |
| 5,192,043 | 3/1993 | Fa | 248/206.5 |
| 5,201,486 | 4/1993 | Holbrook | 248/206.5 |

FOREIGN PATENT DOCUMENTS

| | | | |
|---|---|---|---|
| 3221126 | 6/1982 | Germany | 224/917 |
| 3514129 | 10/1986 | Germany | 224/309 |
| 62-268751 | 10/1988 | Japan . | |

*Primary Examiner*—Henry J. Recla
*Assistant Examiner*—Gregory M. Vidovich
*Attorney, Agent, or Firm*—Hedman, Gibson & Costigan

[57] ABSTRACT

A ski carrier combined with a rubber magnet plate and a vacuum sucking adhering plate to be mounted on a roof of an automobile. A fixing member comprises a fixing plate body and a rubber magnet plate attached to a bottom surface of a fixing plate body and is formed with the vacuum sucking adhering plate inserting portion at the center. A carrier main body for fastening the ski is fixed on a fixing member and is pierced with the shaft inserting hole. A vacuum sucking adhering plate is provided between the vacuum sucking adhering plate inserting portion and the shaft inserting hole, and a cover for covering the ski is connected by a hinge to a carrier main body and it covers on a lever of the vacuum sucking adhering plate.

2 Claims, 4 Drawing Sheets

SKI CARRIER

TECHNICAL FIELD

The present invention relates to a ski carrier for mounting on the roof of an automobile, and more particularly to a ski carrier combined with rubber sucking adhering plates and vacuum sucking adhering plates.

PRIOR ART

Heretofore, carriers for carrying articles which are long in length such as a skis by mounting on the roof of an automobile have been disclosed in Japanese laid open publications of utility model applications Sho-54-15952, Sho-57-202356 and Sho-64-11856. The above-described carriers are mounted by tightening means to a rain receiver or side sill of the automobile at a side of a supporting body and a vacuum sucking adhering plate for fastening to the roof is fixed to the other side and a ski mounting groove is formed in the supporting body. Because it is necessary to be able to either hook up a band or rotate a cover, adhering and releasing has been troublesome, and because releasing has been troublesome, it has become common to drive about town with the carrier carrier even when the carrier is not being used. This detracts from appearance and concerns about theft also arise.

An article which solve the above-described drawbacks of attachment has been disclosed in Japanese laid open published patent application Sho-62-268751. Such an article is one in which the periphery of a sucking adhering means is closely contacted at the bottom end of a dome shaped external housing and a pierced through hole is provided in the external housing through which a shaft of sucking adhering plate provided with a magnet can be inserted thereinto. Then a lever is provided at its upper end and the ski inserted in the dome formed at the head portion of the external housing so that it can be bound with a band. This device has the advantage in that it can either be mounted on the roof of an automobile or can be easily released. However, because anyone can easily remove the vacuum of the sucking adhering plate, the device can be easily released by anyone, and therefore it is disadvantageous in that burglary of the ski or the carrier is hard to prevent.

OBJECTS OF THE INVENTION

Therefore, it is an object of the present invention to provide a ski carrier which can be firmly attached to the roof of an automobile and be easily released without damage to the roof in case it is not being used.

Another object of the present invention is to provide a ski carrier which is made to prevent theft of the skis.

Still another object of the present invention is to provide a ski carrier which prevents damage to the skis by relieving shocks produced during running of the automobile from being directly transferred to the skis.

DISCLOSURE OF THE INVENTION

The present invention accomplishes the above-described objects by providing a fixing plate means of plate-like material and a fixing member made of a rubber magnetic plate attached to its bottom surface, a carrier main body which is fixed to the fixing member for supporting and fixing the ski, a vacuum sucking adhering means provided to a center of the fixing member and to a shaft inserting hole of the carrier main body, a ski fixing means on the carrier main body which is connected to the carrier main body by hinges, and a cover for covering a lever of the vacuum sucking adhering means.

The vacuum sucking adhering means comprises a vacuum sucking adhering plate which is provided at a vacuum sucking adhering plate inserting portion formed at center of the fixing member, an operating shaft which is fixed at a lower end to a center of an upper surface of said vacuum sucking adhering plate and extended to upper portion through the shaft inserting hole pierced to the carrier main body, and a lever which is rotatably connected by a pin to an upper end portion of the operating shaft thereby ascending and descending the operating shaft.

In a preferred embodiment, the present invention is provided with a vacuum releasing means comprising a hooking protrusion formed at one side corner of the vacuum sucking adhering plate inserting portion of the fixing member, and a vacuum releasing means including a protrusion formed at one side edge of the vacuum sucking adhering plate to be hooked up to said hooking protrusion, and a lever provided on the fixing plate means.

BRIEF DESCRIPTION OF THE DRAWINGS

FIG. 3(A) and 3(B) are longitudinal cross sectional views showing a part of vacuum sucking adhering plate of the present invention, in which FIG. 3(A) is a cross sectional view of a state before vacuum, and FIG. 3(B) is a cross sectional view of a state after releasing the vacuum.

DETAILED DESCRIPTION OF THE INVENTION

Figure 1:
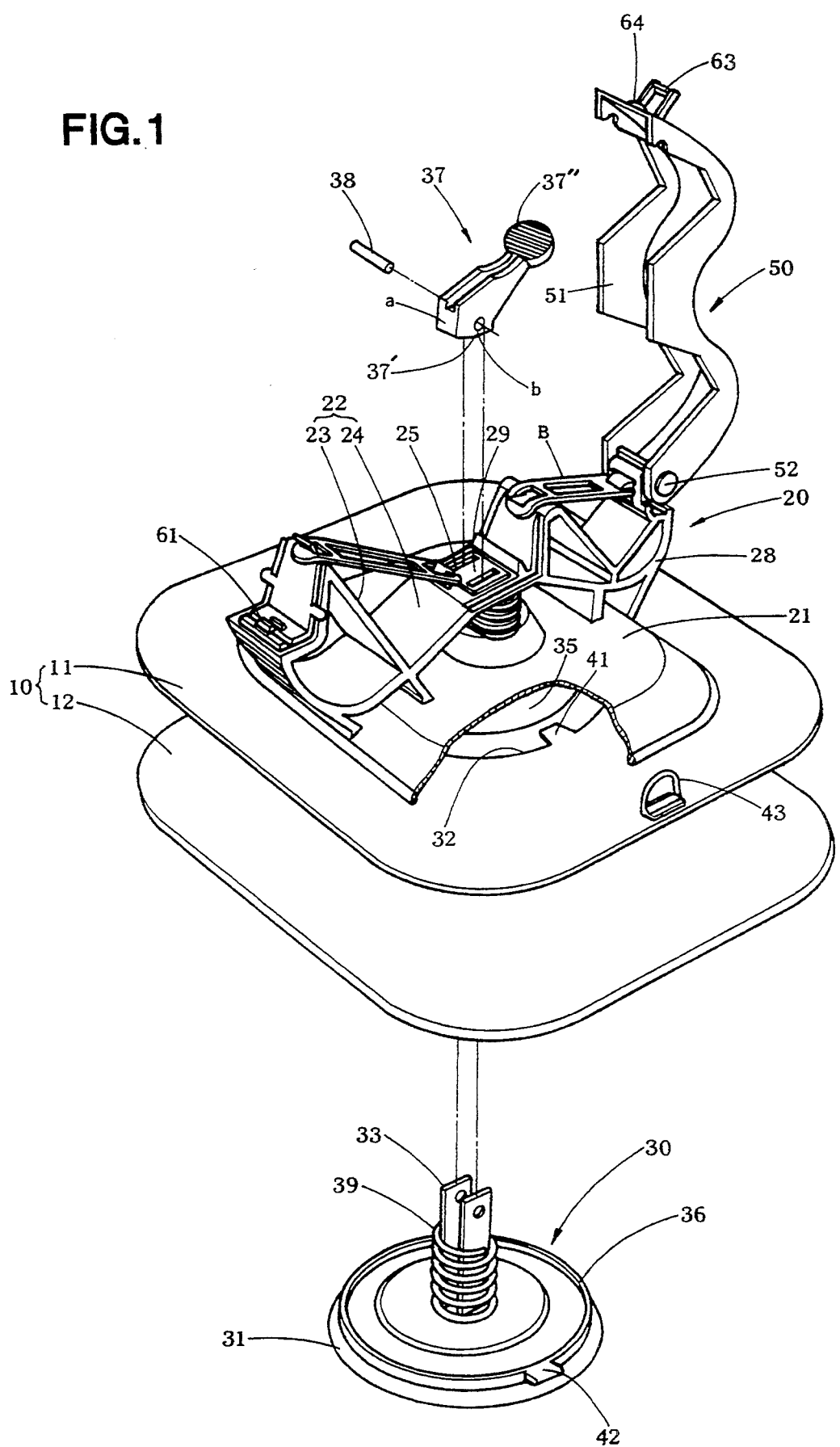
FIG. 1 is an exploded perspective view of an embodiment of the present invention which is partly cut out.
Figure 2:
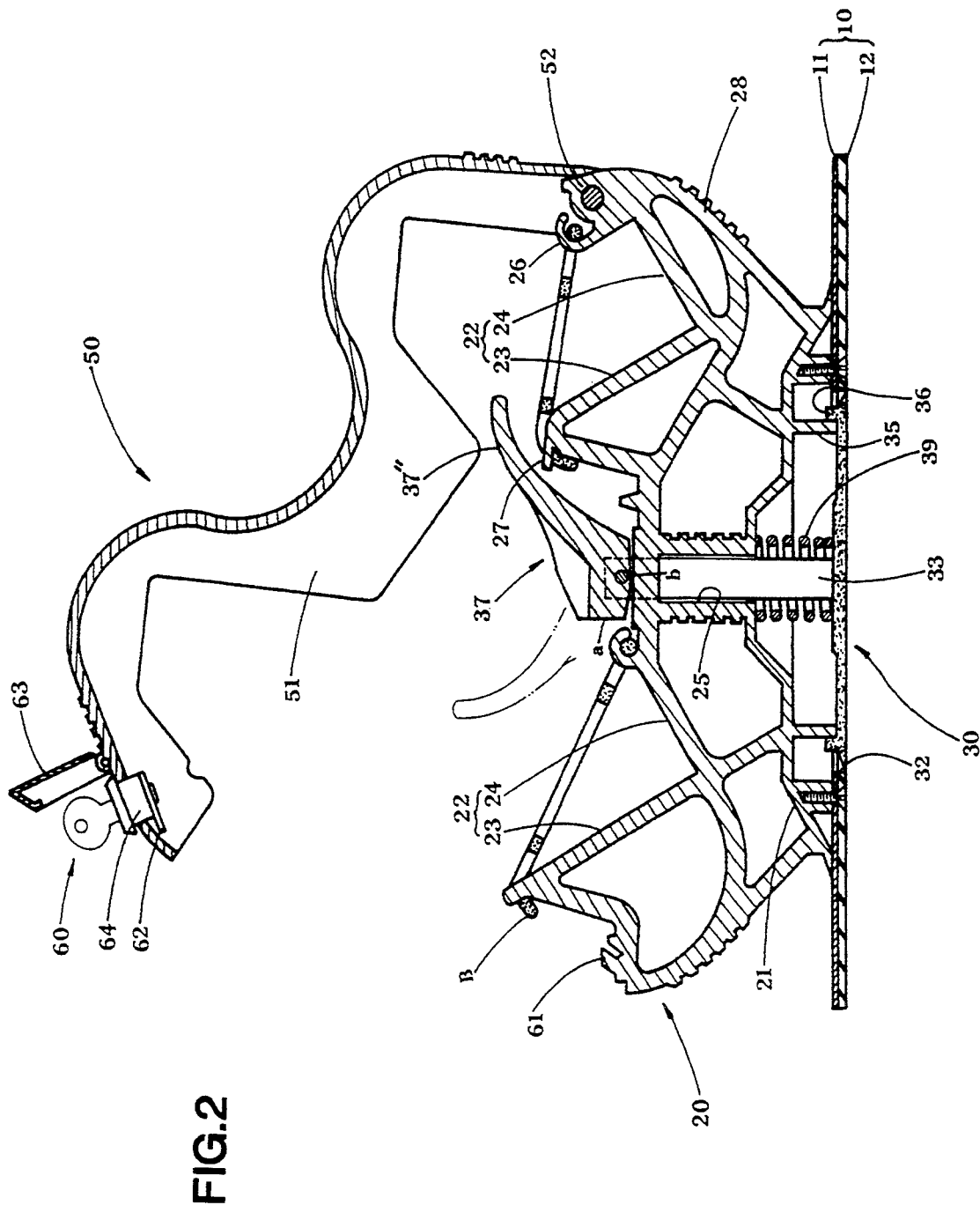
FIG. 2 is a longitudinal cross sectional view of of the present invention.

The present invention comprises, as shown in FIG. 1 and FIG. 2, a fixing member 10 to be fixed on a roof of an automobile, a carrier main body 20 which is fixed to the fixing member 10 and supporting and fixing a ski S, vacuum sucking adhering means 30 provided at the center of the fixing member 10 and to a shaft inserting hole of the carrier main body 20, a cover 50 for covering a ski fixing means 22 of the carrier main body 20 and a lever 37 of the vacuum sucking adhering means 30, and a locking means 60 for locking the cover 50 to the carrier main body 20.

The fixing member 10 includes a fixing plate body 11 of plate-like material made of synthetic resin or metal and a rubber magnet plate 12 adhered to its bottom surface, and a vacuum sucking adhering plate inserting portion 32 to be inserted with a hereinafter described vacuum sucking adhering plate 31 which is formed slightly larger than a diameter of the vacuum sucking adhering plate 31 at the center of the fixing plate body 11 and the rubber magnet plate 12.

The carrier main body 20 includes a supporting base portion 21 which is fixed by a screw to the fixing member 10 and closely contacted on the fixing plate body 11, a shaft inserting hole 25 formed between two ski fixing means 22 of right and left integrally formed on upper portion of said supporting base portion 21 and its ski fixing portion 22, and a locking means 61.

The ski fixing means 22 is integrally formed with the supporting base portion 21 by a connection rib 28 formed to right and left sides of the supporting base portion 21 and formed with a ski corner supporting portion 24 perpendicularly to the ski supporting portion 23 and band hookers 26, 27 are formed to upper end portion of the ski supporting portion 23 and the ski corner supporting portion 24 so as to be able to hook up an elastic band B.

The vacuum sucking adhering means 30 includes a pressing piece 35 protruded in circular shape at the supporting base portion 21 of the carrier main body 20, a vacuum sucking adhering plate 31 provided to a vacuum sucking adhering plate inserting portion 32, a supporting rim 36 of circular shape formed by so contacting that an outer diameter of the pressing piece 35 is contacted to upper surface of the vacuum sucking adhering plate 31, an operating shaft 33 extended to the top thereof through a shaft inserting hole 25 pierced at the center portion of the carrier main body 20, and a lever 37 which is rotatably connected to top end portion 25 of the operating shaft 33 for lifting up and dropping down the operating shaft 33. The operating shaft 33 is fixed to the center portion of the vacuum sucking adhering plate 31 by lever 37, the outer diameter side of the vacuum sucking adhering plate 31 is fixed by the pressing piece 35 and the center portion of the vacuum sucking adhering plate 31 is lifted so that a vacuum is defined.

The lever 37 includes a shaft connecting portion 37' and a handle portion 37''. The shaft connecting portion 37' is rotatably connected to top end of the operating shaft 33 by a pin 38, the shaft connecting portion 37' includes mutually neighboring contacting surface a, b to be contacted to a lever supporting surface 29 formed around the shaft inserting hole 25 of the carrier main body 20, and a distance from one side contacting surface a to the center of the pin 38 is formed longer in distance from other side contacting surface b to the center of the pin 38. Therefore, a sucking adhering operation is accomplished by lifting the operating shaft 33 so that one side contacting surface a is in contact with the lever supporting surface 29, and the sucking adhering operation of the vacuum sucking adhering plate 31 is released by dropping the operating shaft 33 so that other side contacting surface b is in contact with the lever supporting surface 29.

A shock absorbing member 39 elastically supported between the top surface of the vacuum sucking adhering plate and the bottom surface of the supporting base portion 21 at lower portion of the carrier main body 20 is inserted on the operating shaft 33, so that the ski can be protected by preventing that any vibration produced during running of the automobile from being directly transferred to the carrier main body 20.

Preferably, the present invention is provided with a vacuum releasing means 40 to easily release the vacuum sucking adhering plate 31 from the roof, and this vacuum releasing means 40 is formed with a hooking protrusion 41 at one side of the vacuum sucking adhering plate inserting portion 32 of the fixing plate body 11, and a protrusion 42 is formed to one side of the peripheral edge of the vacuum sucking adhering plate 31 such that this protrusion 42 is positioned on the top surface of the hooking protrusion 41, and a handle 43 is provided to one side of the fixing plate body 11 at a side formed with the hooking protrusion 41.

The cover 50 includes both side cover lips 51 which covers the lever 37 positioned at the lever supporting surface 29 with covering the ski fixing means 22 of the carrier main body 20, and a hinge connecting portion 52 connected by hinge with the carrier main body 20.

The locking means 60 is provided with a locking portion 61 at one end of the carrier main body 20, a lock 62 to be locked to said locking portion 61, and a locking block 64 for rotating said lock 62, and a protecting cover 63 is provided for the locking block 64 so as to prevent snow or rain from entering.

In accordance with the ski carrier of the present invention constructed as above, when the cover 50 is lifted up and opened and the lever 37 is rotated so that the contacting surface b of shorter distance to the center of the pin 38 of the shaft connecting portion 37' is contacted to the rubber magnet plate 12 whereby it is put on the roof of the automobile (refer to FIG. 2), the rubber magnet plate 12 attached to the fixing plate body 11 is fixed by a magnetic force. When the lever 37 is rotated so that the contacting surface a of longer distance to the center of the pin 38 of the shaft connecting portion 37' is contacted to the lever supporting surface 29, the operating shaft 33 is lifted up and simultaneously the center portion of the vacuum sucking adhering plate 31 fixed to its bottom end is drawn up so that the bottom surface of the vacuum sucking adhering plate 31 is made to be concave.

At this moment, a volume of space defined between the top surface of the roof and the bottom surface of the vacuum sucking adhering plate 31 at a time when the contacting surface b, long in distance to the center of he pin 38 becomes contacted to the lever supporting surface 29 becomes bigger than a volume of a space defined between the roof and the bottom surface of the vacuum sucking adhering plate 31 so that a contacting surface b short in distance to the center of the pin 38 is contacted to the lever 29. Simultaneously a negative pressure is produced within said space, and the vacuum sucking adhering plate 31 is sucked and adhered by vacuum to the top surface of the roof of the automobile.

Accordingly, since the ski carrier of the present invention is very firmly fixed by a vacuum sucking and adhering function of the vacuum sucking adhering plate 31 as well as a sucking adhering function by a magnetic force of the rubber magnet plate 12 attached to the fixing plate body 11, no concern is caused by either vibration or shock produced during running of automobile and a lifting up of the handle 43 by a person. Since the rubber magnet plate 12 is attached with the fixing plate body 11 made of metal and the like of predetermined width on its top surface, not only it is difficult to insert a screw driver and the like between the rubber magnet plate 11 and the roof but also, even if it is inserted, it can not reach the vacuum sucking adhering plate 31, therefore its release is impossible without releasing the vacuum of the vacuum sucking adhering plate 31.

A pair of ski carriers are attached at the front and back of the roof by this method, an elastic band B is released from one side band hooker 27 and then a corner of the ski S is abutted to the ski corner supporting portion 24 and simultaneously the ski is mounted such that a surface portion of the ski S is abutted to the ski supporting portion 23 and next the elastic band which has been released is fixed to the band hooker 27.

Thereafter, the cover which has been opened is rotated downwardly whereby the ski fixing means 22 of the carrier main body 20 and the lever 37 are covered by the side cover lips 51 so as not to be exposed to exterior and then a key is inserted to the locking block 64 formed at one end of the cover portion 50 and turned to a locking direction then the lock 62 is hooked to the locking portion 61 and locked whereby the cover 50 is made secure. Accordingly, since the lever 37 is covered by the side cover lips 51 whereby it is not exposed to the exterior, the lever 37 becomes secure whereby the ski carrier becomes secure. Therefore, therefore a loss or theft of the ski and the ski carrier can be prevented.

In releasing the ski S from the ski carrier in order to use the ski, it can be simply released by a reverse order of above-described operation, and the ski S can be released when a key is inserted to the locking block 64 and turned to the opening direction and the lock 62 is turned, the lock 62 is drawn out from the locking portion 61 and the locked state is released and the cover 50 is opened by turning the lock 62 and the elastic band B is released.

After releasing the ski S, the elastic band B is hooked up to the band hooker 27 and the cover 50 is shut and then locked by the locking means 60 so that the ski carrier is made secure and thefts can be prevented.

Furthermore, a vibration or shock produced when a car runs with skis fixed to the ski carrier is primarily absorbed by the rubber magnet plate 12 and the vacuum locking adhering plate 31 and then absorbed by the absorbing member 39 provided between the vacuum sucking adhering plate 31 and the bottom surface of the supporting base portion 21 whereby it is not directly transferred to the ski carrier main body 20 and the ski S and thereby a damage of the ski S can be prevented.

Figure 3A:
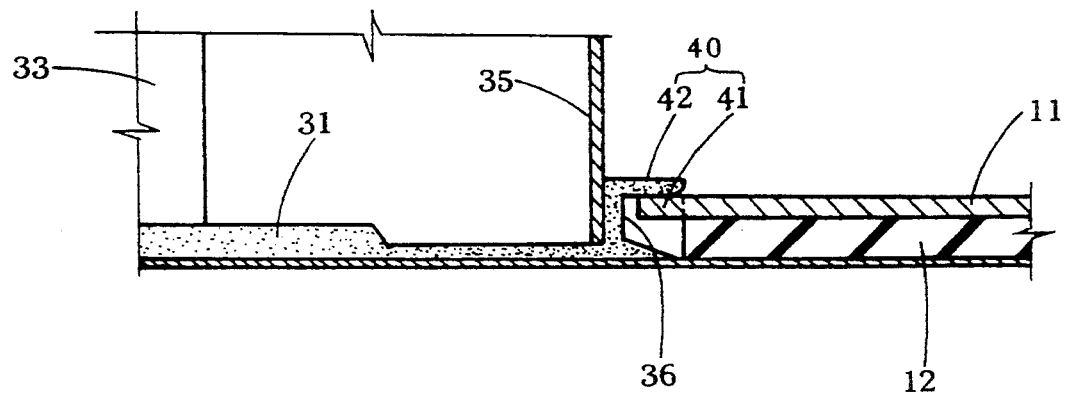
Figure 3B:
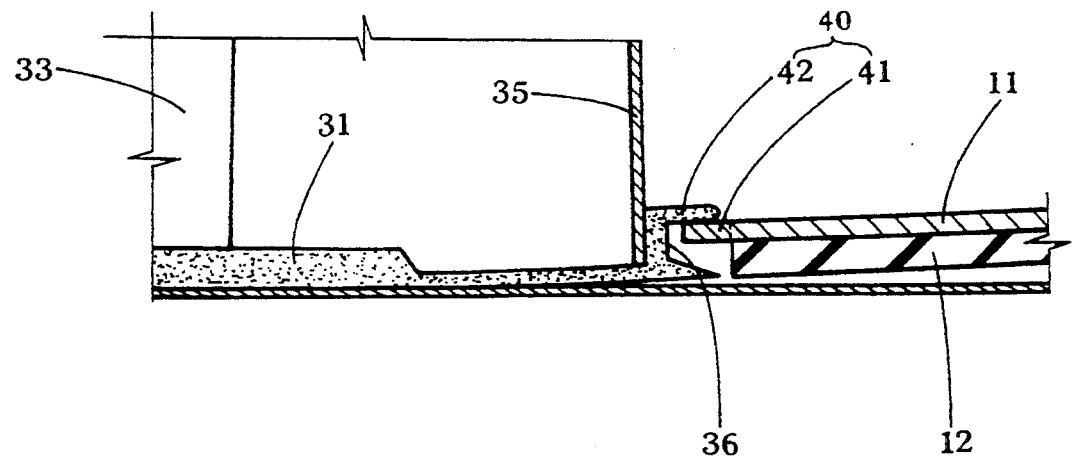
Figure 4:
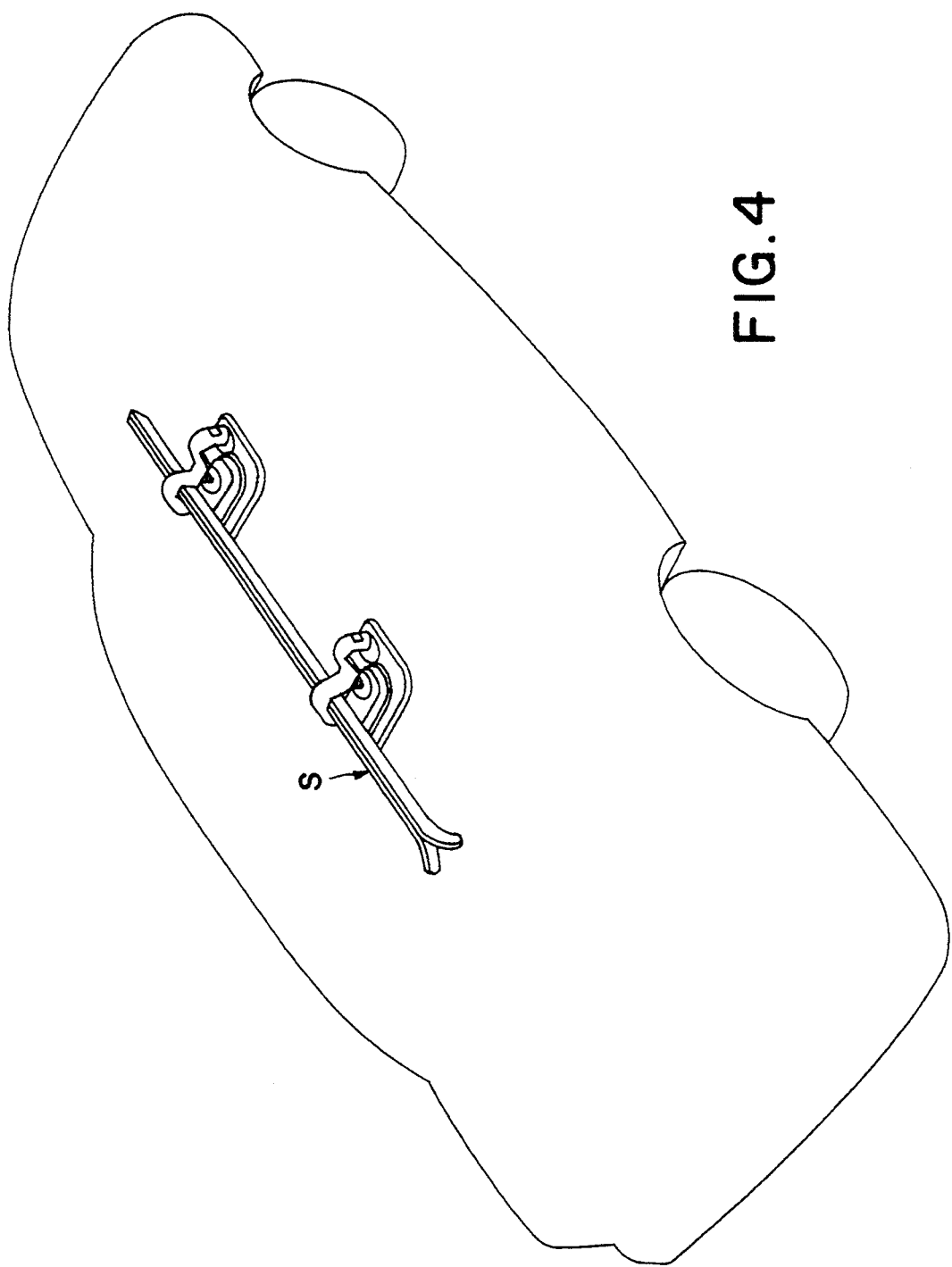
FIG. 4 is a perspective view showing the present invention mounted on an automobile.

In the case when the ski carrier is not in use, the locking means is released and the lever 37 is turned so that the cover 50 is opened and the contacting surface b short in distance to the pin 38 is made to be contacted to the lever supporting surface 29 and the operating shaft 33 is made to be dropped down and the vacuum sucking adhering plate 31 is returned to its original state as in FIG. 2 and then the handle 43 is slightly lifted up. Since the hooking protrusion 41 of the fixing plate body 11 lifts up the protrusion 42 to upward, one side of the vacuum sucking adhering plate 31 is slightly lifted up is maintained [refer to FIG. 3(B)] and as air enters from that place, the negative pressure is removed and the ski carrier can be simply released.

The ski carrier of the present invention as above can be easily released when not in use and it can be firmly attached by using one vacuum sucking adhering plate and rubber magnet plate and it does not damage the roof, and its structure is simple.

Moreover, not only can a burglary of the ski carrier and the ski be prevented, but also the damage to the skis can be prevented by protecting the skis from a shock produced during running of the automobile.

What is claimed is:

1. In a ski carrier comprising an adhering magnet means and a vacuum sucking adhering means, said ski carrier comprising:

an adhering magnet means including a fixing plate body of plate-like material and a rubber magnet plate attached to the bottom of said fixing plate body, a carrier main body which is fixed to said adhering magnet means formed with two ski fixing means in an upper portion of said body, and formed with a shaft inserting hole formed between said ski fixing means and including a locking portion formed at one side of said upper portion, a vacuum sucking adhering means including a vacuum sucking adhering plate inserted to a vacuum sucking adhering plate insertion portion formed to a center of said adhering magnet means and supported with a pressing piece in connection with a supporting base portion of said carrier main body, said vacuum sucking adhering plate further being formed with a supporting rim to contact an outer peripheral edge of said pressing piece, an operating shaft having a lower end being fixed to a center of an upper surface of said vacuum sucking adhering plate and protruding with a top end of said shaft through said vacuum sucking adhering plate insertion portion and through an upper portion of said shaft inserting hole, and a lever for operating said vacuum sucking adhering plate connected on said top end of said operating shaft, and a cover which is connected at one end to one end of said carrier main body opposite said one side by a hinge, and being formed with side cover lips for selectively covering said lever and said shaft inserting hole, and being provided with a locking block on another end of said cover to be selectively locked to said locking portion.

2. The ski carrier as defined in claim 1, wherein a vacuum releasing means is further added which includes a hooking protrusion formed at one side of the vacuum sucking adhering plate inserting portion formed to said center of said adhering magnet means, a protrusion formed at one side peripheral edge of the vacuum sucking adhering plate to be hooked to said hooking protrusion, and a handle provided on the fixing plate body.

* * * * *